US 7,792,899 B2

(12) United States Patent
Shaffer et al.

(10) Patent No.: US 7,792,899 B2
(45) Date of Patent: Sep. 7, 2010

(54) AUTOMATICALLY PROVIDING ANNOUNCEMENTS FOR A PUSH-TO-TALK COMMUNICATION SESSION

(75) Inventors: Shmuel Shaffer, Palo Alto, CA (US);
Dean M. Zanone, Norco, CA (US);
Shah Talukder, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 562 days.

(21) Appl. No.: 11/388,461

(22) Filed: Mar. 24, 2006

(65) Prior Publication Data

US 2007/0226310 A1   Sep. 27, 2007

(51) Int. Cl.
*G06F 15/16* (2006.01)
(52) U.S. Cl. .................. 709/204; 709/237; 709/228; 709/200; 455/518; 455/414.1; 455/90.2
(58) Field of Classification Search ............. 709/246, 709/204, 237, 228, 200; 370/2, 100, 202; 455/518, 414.1, 90.2
See application file for complete search history.

(56) References Cited

U.S. PATENT DOCUMENTS

| | | | | |
|---|---|---|---|---|
| 3,864,746 | A * | 2/1975 | Burgess | 360/4 |
| 5,734,707 | A * | 3/1998 | El-Wailly | 379/167.06 |
| 5,757,897 | A * | 5/1998 | LaBarbera et al. | 379/165 |
| 5,938,721 | A * | 8/1999 | Dussell et al. | 701/211 |
| 6,014,086 | A * | 1/2000 | Miyashita | 340/7.6 |
| 6,094,578 | A * | 7/2000 | Purcell et al. | 455/426.1 |
| 6,185,205 | B1 | 2/2001 | Sharrit et al. | 370/389 |
| 6,233,315 | B1 * | 5/2001 | Reformato et al. | 379/88.01 |
| 6,430,602 | B1 * | 8/2002 | Kay et al. | 709/206 |
| 6,446,004 | B1 * | 9/2002 | Cao et al. | 701/213 |
| 6,477,150 | B1 * | 11/2002 | Maggenti et al. | 370/312 |
| 6,484,033 | B2 * | 11/2002 | Murray | 455/456.3 |
| 6,650,902 | B1 * | 11/2003 | Richton | 455/456.3 |
| 6,678,613 | B2 * | 1/2004 | Andrews et al. | 701/213 |
| 6,775,689 | B1 * | 8/2004 | Raghunandan | 709/206 |
| 6,798,755 | B2 * | 9/2004 | Lillie et al. | 370/312 |
| 6,912,389 | B2 * | 6/2005 | Bright et al. | 455/433 |
| 6,928,294 | B2 | 8/2005 | Maggenti et al. | 455/518 |
| 6,952,592 | B2 * | 10/2005 | Dorenbosch | 455/518 |
| 7,155,248 | B2 * | 12/2006 | Idnani | 455/519 |
| 7,170,863 | B1 * | 1/2007 | Denman et al. | 370/260 |
| 7,330,920 | B2 * | 2/2008 | Black et al. | 710/105 |
| 7,369,567 | B2 * | 5/2008 | Newberg et al. | 370/432 |
| 7,394,798 | B2 * | 7/2008 | Naghian | 370/338 |

(Continued)

OTHER PUBLICATIONS

Unknown Author; Motorola T8550RCAMO specification; Sep. 8, 2008; 123 radios; 2 pages.*

(Continued)

*Primary Examiner*—Joseph Thomas
*Assistant Examiner*—Anthony Fabbri
(74) *Attorney, Agent, or Firm*—Baker Botts L.L.P.

(57) ABSTRACT

Providing announcements for communication sessions includes facilitating the communication sessions among endpoints comprising a half-duplex push-to-talk endpoint. It is established that a trigger event has occurred at the half-duplex push-to-talk endpoint, where the trigger event indicates an activity status of the half-duplex push-to-talk endpoint. One or more announcements associated with the trigger event are identified. The one or more announcements are provided to at least a subset of the endpoints.

23 Claims, 3 Drawing Sheets

U.S. PATENT DOCUMENTS

| | | | |
|---|---|---|---|
| 7,412,529 B2* | 8/2008 | Ryu | 709/230 |
| 7,433,680 B2* | 10/2008 | Jenkins et al. | 455/412.1 |
| 7,509,652 B2* | 3/2009 | Niemi | 719/318 |
| 7,522,613 B2* | 4/2009 | Rotsten et al. | 370/400 |
| 7,561,892 B2* | 7/2009 | Huh et al. | 455/518 |
| 7,620,411 B2* | 11/2009 | Shiga | 455/518 |
| 7,668,149 B2* | 2/2010 | Zhao et al. | 370/349 |
| 2002/0075305 A1* | 6/2002 | Beaton et al. | 345/751 |
| 2002/0077136 A1* | 6/2002 | Maggenti et al. | 455/518 |
| 2002/0150091 A1* | 10/2002 | Lopponen et al. | 370/389 |
| 2003/0063580 A1* | 4/2003 | Pond | 370/328 |
| 2003/0224762 A1* | 12/2003 | Lau et al. | 455/412.2 |
| 2003/0224825 A1* | 12/2003 | Cox et al. | 455/560 |
| 2003/0225589 A1* | 12/2003 | Eaton et al. | 705/1 |
| 2004/0190489 A1* | 9/2004 | Palaez et al. | 370/351 |
| 2005/0054361 A1* | 3/2005 | Turcanu et al. | 455/518 |
| 2005/0122923 A1 | 6/2005 | Jang et al. | |
| 2005/0122937 A1 | 6/2005 | Hart et al. | 370/335 |
| 2005/0124290 A1* | 6/2005 | Bostrom et al. | 455/3.06 |
| 2005/0182816 A1* | 8/2005 | Lin et al. | 709/200 |
| 2005/0220079 A1* | 10/2005 | Asokan | 370/352 |
| 2006/0014498 A1* | 1/2006 | Yau et al. | 455/90.2 |
| 2006/0056689 A1* | 3/2006 | Wittebrood et al. | 382/173 |
| 2006/0058052 A1* | 3/2006 | Plestid et al. | 455/519 |
| 2006/0154681 A1 | 7/2006 | Park et al. | 455/518 |
| 2006/0168346 A1* | 7/2006 | Chen et al. | 709/246 |
| 2006/0229093 A1* | 10/2006 | Bhutiani et al. | 455/518 |
| 2006/0270361 A1* | 11/2006 | Szymanski et al. | 455/90.2 |
| 2006/0281471 A1 | 12/2006 | Shaffer et al. | 455/456.2 |
| 2007/0036100 A1 | 2/2007 | Shaffer et al. | 370/328 |
| 2007/0036118 A1* | 2/2007 | Shaffer et al. | 370/338 |
| 2007/0037596 A1* | 2/2007 | Shaffer et al. | 455/518 |
| 2007/0104121 A1* | 5/2007 | Shaffer et al. | 370/276 |
| 2007/0105578 A1* | 5/2007 | Shaffer et al. | 455/518 |
| 2007/0105579 A1 | 5/2007 | Shaffer et al. | 455/519 |
| 2007/0133435 A1* | 6/2007 | Eneroth et al. | 370/260 |
| 2007/0190983 A1* | 8/2007 | Goldfarb et al. | 455/414.1 |
| 2007/0192428 A1* | 8/2007 | Goldfarb et al. | 709/207 |
| 2007/0220169 A1* | 9/2007 | Silver et al. | 709/246 |
| 2008/0039029 A1* | 2/2008 | Dostal et al. | 455/90.2 |
| 2008/0064378 A1* | 3/2008 | Kahan et al. | 455/414.1 |
| 2008/0102869 A1* | 5/2008 | Shaffer et al. | 455/518 |
| 2008/0220765 A1* | 9/2008 | Chu et al. | 455/422.1 |
| 2009/0131092 A1* | 5/2009 | Kaida | 455/518 |
| 2009/0215410 A1* | 8/2009 | Cai et al. | 455/90.2 |
| 2010/0016008 A1* | 1/2010 | Brewer et al. | 455/518 |

OTHER PUBLICATIONS

Crawford, SX700R; Feb. 18, 2006; CS online; 5 pages.*
Unknown Author; NOAA Weather Radio All Hazards; Feb. 4, 2005; National Weather Service; 4 pages, Description of weather radio.*
Cisco Land Mobile Radio Gateway, Data Sheet, Copyright © Cisco Systems, Inc. www.cisco.com, pp. 1-7, Printed Mar. 2006.
Cisco IP Interoperability and Collaboration System, Q&A, Copyright © Cisco Systems, Inc. www.cisco.com, pp. 1-5, Printed Mar. 2006.
Cisco IPICS, Solution Overview, Copyright © Cisco Systems, Inc., www.cisco.com/go/ipics, pp. 1-7, Printed Mar. 2006.
Matthews, Dr. J. W., *A New Interoperability Paradigm, A Concept Proposal*, Worcester Polytechnic Institute, Mar. 2006 (15 pages).
PCT Notification of transmittal of the International Search Report and the Written Opinion of the International Searching Authority, or the Declaration mailed Feb. 10, 2009 in reference to PCT/US2006/041675 International Patent Application filed Oct. 26, 2006.
NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.
Network Solution:, Information Sheet, NetworkFirst, M/A-COM, Inc., http://www.networkfirst.com/features/solution, 2 pages, 2003.
It's Our Network That Makes The Difference, Information Sheet, OpenSky Network, M/A-COM, Inc., http://www.opensky.com/network/index.asp, 2 pages, Feb. 9, 2004.
Network Management, Information Sheet, OpenSky Network, M/A-COM, Inc., http://www.opensky.com/network/netmgmtsys.asp, 2 pages, Oct. 11, 2004.
ACU-1000™ Interoperability NOW™, Information Sheet, Raytheon JPS Communications, http://www.jps.com/downloads/PDFS/acuupgrade.pdf, 4 pages, Mar. 2004.
Interoperability Gateway, OpenSky, NetworkFirst, P25$^{IP}$, Data Sheet, M/A-COM, Inc. ECR-7054, http://www.opensky.com/network/7054.pdf, 2 pages, May 2003.
C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.
V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.
J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.
OnStar Technology, Information Sheet, OnStar Corp., http://www.onstar.com/us_english/jsp/explore/onstar_basics/technology.jsp, 3 pages, 2005.
Dennis, Patrick; Draft of document entitled "Land Mobile Radio (LMR) Standing Operating Procedures (SOP);" Department of the Army, Fort Gordon, GA; 5 pages, Jan. 18, 2006.
Matthews, Dr. J. W., *A New Interoperability Paradigm, A Concept Proposal*, Worcester Polytechnic Institute, Mar. 2006 (15 pages), prior to Mar. 24, 2006.
Patent Cooperation Treaty, From the International Searching Authority, Invitation to Pay Additional Fees and, Where Applicable, Protest Fee in International Application No. PCT/US2006/041675, dated Dec. 10, 2008, 2 pages.
Shaffer, et al., U.S. Appl. No. 11/267,645, filed Nov. 4, 2005, Communication from the U.S. Patent Office dated Sep. 18, 2008.
Shaffer, et al., U.S. Appl. No. 11/267,645, filed Nov. 4, 2005, Communication from the U.S. Patent Office dated Apr. 23, 2009.
Shaffer, et al., U.S. Appl. No. 11/267,693, filed Nov. 4, 2005, Communication from the U.S. Patent Office dated Feb. 26, 2008.
Shaffer, et al., U.S. Appl. No. 11/267,693, filed Nov. 4, 2005, Communication from the U.S. Patent Office dated Sep. 17, 2008.
Shaffer, et al., U.S. Appl. No. 11/267,915, filed Nov. 4, 2005, Communication from the U.S. Patent Office dated Aug. 21, 2009.
Shaffer et al., U.S. Appl. No. 11/267,693, filed Nov. 4, 2005, Communication from the U.S. Patent and Trademark Office mailed Feb. 22, 2010.
Shaffer, et al., U.S. Appl. No. 11/267,645, filed Nov. 4, 2005, Office Action from U.S. Patent and Trademark Office dated Sep. 30, 2009, 14 pages.
Communication from European Patent Office in The Netherlands mailed Sep. 30, 2009 regarding PCT/US2006/041675.

* cited by examiner

AUTOMATICALLY PROVIDING ANNOUNCEMENTS FOR A PUSH-TO-TALK COMMUNICATION SESSION

TECHNICAL FIELD OF THE INVENTION

This invention relates in general to communication systems and, more particularly, to a method and system for automatically providing announcements for a push-to-talk communication session.

BACKGROUND OF THE INVENTION

Public and private groups such as groups of security and safety personnel (for example, police officers, fire fighters, and emergency medical technicians) may need to communicate with each other. These groups, however, may utilize endpoints and communication networks that use different technologies. For example, safety personnel may utilize land mobile radios communicating using push-to-talk technologies, while police dispatchers may utilize personal computers communicating using wired network technologies.

Interoperability solutions attempt to provide communications among different endpoints and different networks. Organizations working towards interoperability solutions include JPS COMMUNICATIONS of RAYTHEON CORPORATION, IP BLUE SOFTWARE SOLUTIONS, TWISTED PAIR SOLUTIONS, INC., M/A-COM, INC., MOTOROLA, INC., and CISCO SYSTEMS, INC.

Communications among different endpoints and different networks, however, may be difficult. Collaboration between the different groups and networks tends to be ad hoc and inefficient, and often involves laborious manual intervention.

SUMMARY OF THE INVENTION

The present invention provides a method and system for providing a push-to-talk service that substantially reduces or eliminates at least some of the disadvantages and problems associated with previous methods and systems.

In accordance with a particular embodiment, providing announcements for communication sessions includes facilitating the communication sessions among endpoints comprising a half-duplex push-to-talk endpoint. It is established that a trigger event has occurred at the half-duplex push-to-talk endpoint, where the trigger event indicates an activity status of the half-duplex push-to-talk endpoint. One or more announcements associated with the trigger event are identified. The one or more announcements are provided to at least a subset of the endpoints.

In accordance with another embodiment, providing announcements for communication sessions includes a trigger event that indicates that a half-duplex endpoint has relinquished floor control of one or more communication sessions, and an announcement that comprises a talk termination announcement.

In accordance with another embodiment, providing announcements for communication sessions includes a trigger event that indicates that a half-duplex endpoint has terminated one or more communication sessions, and an announcement that comprises a session termination announcement.

In accordance with another embodiment, providing announcements for communication sessions includes a trigger event that indicates that a half-duplex endpoint has requested floor control for one or more communication sessions, and an announcement that comprises a user identifier announcement announcing a user identifier of a user associated with the half-duplex endpoint.

Technical advantages of particular embodiments include automatically providing announcements to endpoints in response to trigger events that occur at a half-duplex endpoint. Automatically providing announcements may allow for more efficient communication with half-duplex endpoints. Moreover, in some cases, the announcements may include phrases that indicate the activity status of endpoints, allowing users to efficiently communicate their status.

In addition, in particular embodiments in which a half-duplex endpoint is participating in multiple virtual talk groups, a specific announcement may be provided to each group. Furthermore, in some cases, the announcements may be stored at an interoperability system and downloaded to the endpoints.

Other technical advantages will be readily apparent to one skilled in the art from the following figures, descriptions and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
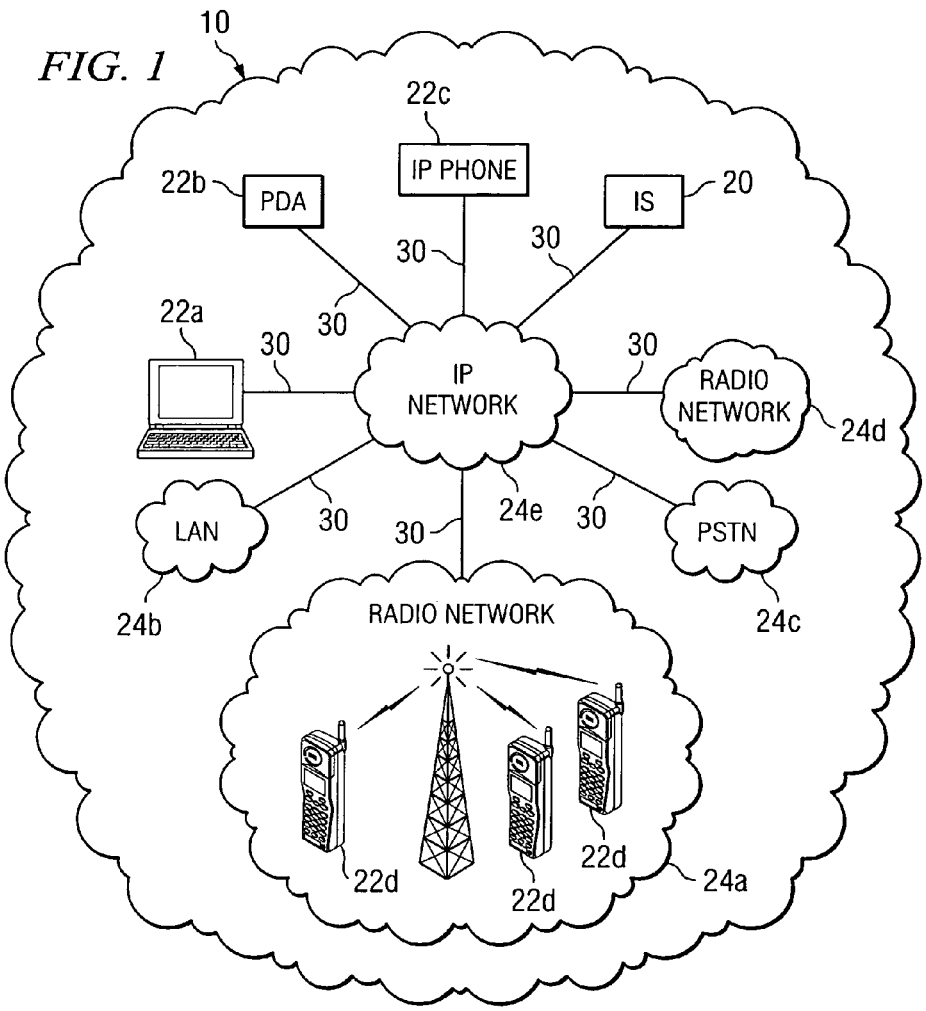
FIG. 1 illustrates a communication system with various communication networks and an interoperability system, in accordance with a particular embodiment.

FIG. 1 illustrates a communication system 10, in accordance with a particular embodiment. Communication system 10 includes communication networks 24a-24e, an interoperability system (IS) 20, and endpoints 22a-22d. IS 20 is able to facilitate interoperable communication sessions between and among various communication devices, such as endpoints 22. IS 20 may use a systems approach to offer a framework based on Internet Protocol (IP) protocols and services in order to provide secure voice, video, and other data interoperability among endpoints 22 and networks 24 utilizing different technologies.

According to one embodiment, communication system 10 may automatically make announcements according to a standardized protocol. According to the embodiment, endpoints 22 may include one or more push-to-talk (PTT) endpoints that may participate in one or more communication sessions. In certain situations, such as emergency situations, a standardized protocol may be used to expedite communication.

According to an example standardized protocol, a standardized vocabulary may be used. For example, a talk termination phrase, such as "over", may be used to indicate that a user has finished talking, is yielding floor control to the other participants, and is expecting a reply. A session termination phrase, such as "over and out", may be used to indicate that a user has finished talking, is yielding floor control, and is not expecting a reply. In addition, a user identifier for the active endpoint may be announced. In some cases, a user participating in multiple communication sessions may have different identifiers for each communication session.

According to the embodiment, communication system 10 may automatically announce standardized vocabulary and user identifiers at appropriate points of the communication session. The automated announcements may provide for more efficient communication with push-to-talk endpoints, which may be of value in certain situations such as emergency situations.

According to the illustrated embodiment, communication system 10 operates to allow endpoints 22 to participate in one or more communication sessions. A communication session may refer to an active communication among two or more endpoints 22. As an example, a communication session may occur between an endpoint 22 and another endpoint 22, or between an endpoint 22 and a defined set of other endpoints 22. Information is communicated during a communication session. Information may refer to voice, data, text, audio, video, multimedia, control, signaling, other information, or any combination of the preceding.

Communication system 10 includes communication networks 24a-24e. Communication networks 24 may be distributed locally or across multiple cities or other geographic regions. A communication network 24 may comprise any suitable IP or non-IP communication network of any wireless or wireline form.

A communication network 24 may comprise at least a portion of one or more of the following: a public switched telephone network (PSTN), a public or private data network, a local area network (LAN), a metropolitan area network (MAN), a wide area network (WAN), a local, a cellular network, regional, or global communication or computer network such as the Internet, a wireline or wireless network, an enterprise intranet, a land mobile radios (LMR) network, a Code Division Multiple Access (CDMA) network, a Time Division Multiple Access (TDMA) network, a Global System for Mobile Communications (GSM) network, a satellite network, other suitable network, or any combination of the preceding.

A communication network 24 may utilize communication protocols and technologies to provide the communication sessions. Example communication protocols and technologies include those set by the Institute of Electrical and Electronics Engineers, Inc. (IEEE) 802.xx, International Telecommunications Union (ITU-T) standards, European Telecommunications Standards Institute (ETSI) standards, Internet Engineering Task Force (IETF) standards, or other standards.

As an example, a communication network 24 may communicate data in streams of packets according to a packet technology for example, Internet protocol (IP) technology. A packet may comprise a bundle of data organized in a specific way for transmission, and a frame may comprise the payload of one or more packets organized in a specific way for transmission. A packet technology may allow for the addressing or identification of endpoints, nodes, and/or other devices of or coupled to the communication network 24. For example, each device coupled to an IP network may be identified using IP addresses. In this manner, the communication network 24 may support any form and/or combination of point-to-point, multicast, unicast, or other techniques for exchanging media packets among components of communication system 10.

As another example, a communication network 24 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

Communication system 10 may comprise any suitable number of any suitable communication networks 24. In the illustrated embodiment, communication networks 24a and 24d comprise radio networks (RNs), communication network 24b comprises a LAN, communication network 24c comprises a PSTN, and communication network 24e comprises an IP network.

Radio networks 24a and 24d may support communication among mobile endpoints, such as land mobile radios (LMRs), using any suitable communication methods or features, such as cellular or push-to-talk (PTT). PSTN 24c may include switching stations, central offices, mobile telephone switching offices, pager switching offices, remote terminals, other related telecommunications equipment, or any combination of any of the preceding.

Communication network 24b may communicate signals transmitted to telephony devices located on different, but interconnected, IP networks. Communication network 24b may also be coupled to non-IP telecommunication networks through, for example, the use of interfaces or components, including gateways. In one embodiment, communication network 24b may be coupled with PSTN 24c through a gateway, which may be a part of IS 20 or network 24e.

Communication networks 24 may comprise networks of particular public and private groups such as agencies or companies. For example, communication networks 24 may comprise networks for security and safety personnel (for example, police officers, fire fighters, and emergency medical technicians) or for a particular company. Communication networks 24 may be operational with respect to a particular area or otherwise.

Communication networks 24 may include any number and combination of devices. In general, a device may include any suitable arrangement of components operable to perform the operations of the device, and may comprise logic. As an example, one or more components of system 10 may include logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable device operable to execute instructions and manipulate data to perform operations. For example, a processor may comprise a microprocessor, controller, or any other suitable computing device.

"Interface" may refer to logic of a device operable to receive input for the device, send output from the device, perform suitable processing of the input or output or both, or any combination of the preceding, and may comprise one or more ports, conversion software, or both. "Memory" may refer to volatile or non-volatile logic operable to store and facilitate retrieval of information, and may comprise Random Access Memory (RAM), Read Only Memory (ROM), optical media, a magnetic media, a disk drive, a Compact Disk (CD)

drive, a Digital Video Disk (DVD) drive, removable media, any other suitable local or remote data storage medium, or a combination of any of the preceding.

Communication networks 24 may include any suitable number of any suitable combination of segments, nodes, and endpoints to enable communication. A node may comprise any suitable number of any suitable communication devices. One or more nodes of a communication network 24 may include network components, gatekeepers, call managers, conference bridges, routers, hubs, switches, gateways, base stations, endpoints, other devices that allow for the exchange of data in communication system 10, or any combination of any of the preceding.

Segments 30 couple networks 24, endpoints 22, and IS 20. Segments 30 may comprise any suitable wireless or wireline communication links, including one or more communication networks. In particular embodiments, segments 30 may include gateways for facilitating communication between various networks, such as an LMR gateway between radio network 24a and IP network 24e.

Endpoints 22 may represent any suitable device or system of devices operable to provide communication services to a user. Endpoints 22 may provide communication services by sending and receiving streams of packets.

An example endpoint 22 may comprise a telephone, a cellular phone, an IP phone, a personal digital assistant (PDA), a fax machine, a personal computer (PC), a sensor such as a camera or a video monitor, a land mobile radio (LMR), a command center, a gateway, any other communication device or system of devices, or any suitable combination of any of the preceding. In the illustrated embodiment, endpoints 22 comprise a PC (endpoint 22a), PDA (endpoint 22b), an IP phone (endpoint 22c), and LMRs (endpoints 22d of communication network 24a). Endpoints 22 and IS 20 may also include unattended or automated systems, gateways, or other devices that can establish media sessions.

Endpoints 22 may be IP or non-IP enabled. IP enabled endpoints 22 may comprise IP telephony devices capable of participating in IM, video, and other multimedia communication sessions. IP telephony devices have the ability to encapsulate user input (such as voice) into IP packets so that the input can be transmitted over a communication network. IP telephony devices may use Voice over IP (VOIP), or Voice over Packet (VoP), technology. Endpoints 22 may include endpoint devices running telephony software, other device capable of performing telephony functions, or any suitable combination of any of the preceding.

IS 20 enables, facilitates, and/or provides for interoperable communication among communication devices, such as endpoints 22, using IP. As indicated above, such network interoperability includes the interoperability of push-to-talk voice technology within various networks and the interoperability between push-to-talk and full duplex dialed connections.

IS 20 may map devices to IP addresses to allow the devices to communicate with other devices. As an example, IS 20 may control gateways of segments 30 to map radio frequencies of particular radio endpoints to IP addresses to allow the radio endpoints to communicate with each other. In some embodiments, IS 20 may host conferences that bridge communications received from endpoints.

Addresses may be assigned in any suitable manner. Multicast IP addresses may be assigned one or more endpoints of one or more communication networks. As an example, a group of endpoints may be combined into a virtual talk group (VTG) for communication using a particular IP address. The virtual talk group may be assigned a multicast IP address through which endpoints of the talk group may communicate.

IS 20 may communicate in other manners. As an example, IS 20 may communicate using a peer-to-peer dialed connection or a nailed dialed connection. Communication methods may be combined to facilitate communication among endpoints. For example, in some cases certain endpoints of a virtual talk group may participate in the talk group through a multicast IP address, while other endpoints may utilize a nailed SIP connection.

IS 20 may be utilized and implemented in any number of market segments, such as enterprise safety and security (for example, loss prevention), transportation, retail, public safety, and federal agencies in order to provide radio and non-radio network interoperability within and between such market segments.

According to one embodiment, communication system 10 may automatically make announcements according to a standardized protocol. For example, standardized vocabulary and user identifiers may be automatically announced at appropriate points of the communication session. The automated announcing is described in more detail with reference to FIGS. 2 through 5.

Modifications, additions, or omissions may be made to communication system 10 without departing from the scope of the invention. The components of communication system 10 may be integrated or separated according to particular needs. Moreover, the operations of system 10 may be performed by more, fewer, or other modules. Additionally, operations of system 10 may be performed using any suitable logic.

Figure 2:
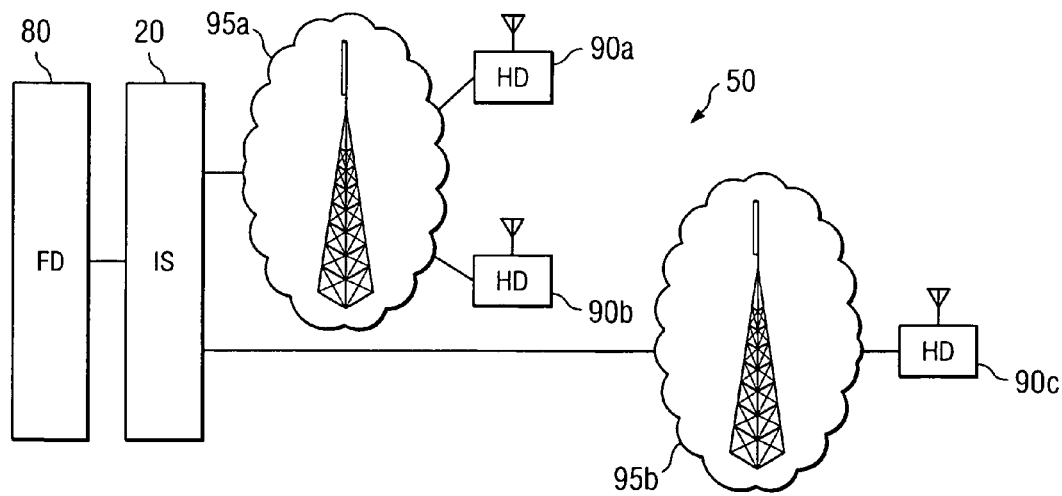
FIG. 2 illustrates a system for providing a push-to-talk communication session, in accordance with a particular embodiment.

FIG. 2 illustrates a communication system 50 for providing a push-to-talk communication session, in accordance with a particular embodiment. Communication system 50 includes a full duplex endpoint 80, one or more half-duplex endpoints 90a-c, one or more communication networks 95a-b, and an IS 20 coupled as shown.

Communication networks 95 allow for communication among endpoints 90, and may comprise, for example, land mobile radio networks of different public or private groups. Endpoints 80 and 90, however, may communicate with IS 20 through any of a variety of communication networks. In some cases, communications between endpoints 80 and 90 may not travel through IS 20, but may travel through gateways and other network components controlled by IS 20.

IS 20 may be substantially similar to the IS described with reference to FIG. 1. IS 20 may facilitate interoperable communication among endpoints 80 and 90, and is described in more detail with reference to FIG. 3. Endpoints 80 and 90 may be substantially similar to endpoints generally described with reference to FIG. 1. An example endpoint is described in more detail with reference to FIG. 4.

Endpoint 80 represents any suitable full duplex endpoint capable of communicating in a full duplex manner. A full duplex endpoint may receive and transmit communications at the same time using, for example, separate communication channels for incoming and outgoing communications. A channel may refer to a unidirectional or bidirectional path for transmitting and/or receiving electrical or electromagnetic signals. For example, a channel may comprise a conventional radio physical radio frequency (RF) channel. Example full duplex endpoints include a PSTN phone and a cellular phone.

Endpoints 90 represent any suitable half-duplex endpoint capable of communicating in a half-duplex manner. A half-duplex endpoint may only either transmit or receive communications at one time, as one communication channel is used for incoming and outgoing communications. An example half-duplex endpoint comprises a push-to-talk endpoint such as a push-to-talk land mobile radio. To communicate over the channel, a user may select a talk button. To end communication over the channel, the user may deselect the talk button.

According to one embodiment of operation, full duplex endpoint 80 calls into IS 20 in order to participate in a virtual talk group of users of half-duplex endpoints 90. IS 20 facilitates communication among the endpoints 80 and 90. For example, a multipoint conference system of IS 20 may bridge together transmissions from an endpoint 80 or 90 for communication to the other endpoints 80 or 90.

An endpoint 80 or 90 may "control the floor" in order to become an active endpoint and have its communications transmitted to and received by other endpoints 80 or 90. Otherwise, communication from endpoint 80 may not reach a half-duplex endpoint 90 that is currently sending a communication, and vice versa.

IS 20 may provide floor control through a mute function. An endpoint 80 or 90 that has floor control is allowed to communicate, and the other endpoints 80 or 90 are muted. As an example, when full duplex endpoint 80 has floor control, communications from full duplex endpoint 80 are transmitted to half-duplex endpoints 90, which are muted. IS 20 prevents half-duplex endpoints 90 from gaining floor control. When full duplex endpoint 80 does not have floor control, a half-duplex endpoint 90 may gain floor control to send communications to the other endpoints 80 and 90.

According to one embodiment, IS 20 may facilitate communication among endpoints of various networks through virtual talk groups. A talk group may comprise a defined set of users (for example, radio users) who share a common functional responsibility and typically coordinate actions amongst themselves without radio interface with other talk groups. For example, a municipality's police department network may include various talk groups of different users.

A virtual talk group may allow member endpoints of a talk group to interoperably communicate over a virtual channel. A virtual channel may comprise a virtual channel address through which member endpoints may access the virtual talk group and/or through which communications from member endpoints are bridged. As an example, a virtual channel address may comprise an IP address. A virtual talk group may have a virtual talk group identifier that uniquely identifies the virtual talk group.

A virtual talk group may have any suitable format. As a first example, endpoints of a virtual talk group may use a multicast address for access. As a second example, a virtual talk group may comprise multiple talk groups, such as multiple radio sources from different frequencies with mixed communications. As a third example, a virtual talk group may comprise a unicast group or a combination unicast and multicast group.

Virtual talk groups may be created using any suitable user/endpoint groups or channels based on location, organizational requirements, event requirements, or any other suitable characteristic. An example virtual talk group may comprise channels or other multicast paths used by endpoints of a police department's radio network, a fire department's radio network, a corporation's security radio network, and IP-enabled endpoints such as IP phones, IP-enabled PDAs, or PCs.

According to one embodiment, communication system 50 may provide automated announcements to a virtual talk group in response to trigger events that occur at a half-duplex endpoint 90. A trigger event may indicate an activity status of half-duplex endpoint 90. The announcements may be associated with specific trigger events. According to one embodiment, a standardized protocol may be used to determine the type of announcement to make in response to specific trigger events.

According to an example standardized protocol, a standardized vocabulary may be used. As an example, a talk termination phrase, such as "over", may be used to indicate that a user has finished talking, is yielding floor control to other participants, and is expecting a reply. A session termination phrase, such as "over and out", may be used to indicate that a user has finished talking, is yielding floor control, and is not expecting a reply.

Communication system 50 may automatically announce the standardized phrases in response to trigger events that occur at half-duplex endpoint 90. According to one embodiment, half-duplex endpoint 90 has a talk button or a button section for each phrase. As an example, a talk button may have two sections, a first section for a talk termination phrase and a second section for a session termination phrase. Either section may be used to gain floor control The talk termination phrase may be automatically announced in response to a user deselecting the first section. The session termination phrase may be automatically announced in response to a user deselecting the second section.

In addition, a user identifier for the active user, that is, the user of the active endpoint, may be announced when the endpoint is granted floor control. A user identifier may refer to an identifier that uniquely identifies a user. Example user identifiers for a user may include the personal name of the user, the role of the user, the rank of the user, the location of the user, other user attribute, or any combination of the preceding. A user may have a specific user identifier for a particular virtual talk group. For example, a user may have user identifier "Sam3" on the police channel, user identifier "SergeantD" on a fire channel, and user identifier "Dean" on a command channel.

Communication system 50 may automatically announce the user identifier for the active user in response to trigger events that occur at half-duplex endpoint 90. As an example, the user identifier may be automatically announced in response to a user selecting a talk button and is granted floor control. If the active endpoint is participating in multiple communication sessions, for example, multiple virtual talk group sessions, the specific user identifier for the particular virtual talk group may be announced. User identifiers of similar duration may be used for the different virtual talk group sessions to yield announcements of similar duration.

The user identifier may be announced to endpoints in any suitable manner. As an example, the user identifier may be announced at endpoints other than the active endpoint at the regular volume, but may be announced at the endpoint of the active endpoint at a lower volume. If the user is participating in multiple virtual talk groups with different user identifiers, the user identifier with the longest duration may be announced at the active endpoint.

Automatically making announcements may involve obtaining, storing, and providing the announcements. The announcements may be obtained in any suitable manner. As an example, a user may record an announcement using a microphone located at, for example, an endpoint. The user may record the announcement at any suitable time, such as at the beginning of a communication session or at some time before the communication session. As another example, a speech synthesizer or a person other than the user may pre-record an announcement. As another example, a text-to-speech mechanism may generate an announcement from text input. Announcements for a particular communication session may include announcements obtained in one manner or announcements obtained in different manners.

The announcements may be stored in any suitable manner. As an example, an announcement may be stored at an endpoint of the user, for example, the endpoint of the user who recorded the announcement. As another example, an announcement may be stored at IS 20. In the example, the announcement may be downloaded to the endpoint during a login process.

The announcements may be provided in any suitable manner. As an example, an audio recording of the announcement may be played through a speaker. As another example, the text format of the announcement may be displayed on a display.

Modifications, additions, or omissions may be made to system 50 without departing from the scope of the invention. The components of system 50 may be integrated or separated according to particular needs. Moreover, the operations of system 50 may be performed by more, fewer, or other modules. Additionally, operations of system 50 may be performed using any suitable logic.

Figure 3:
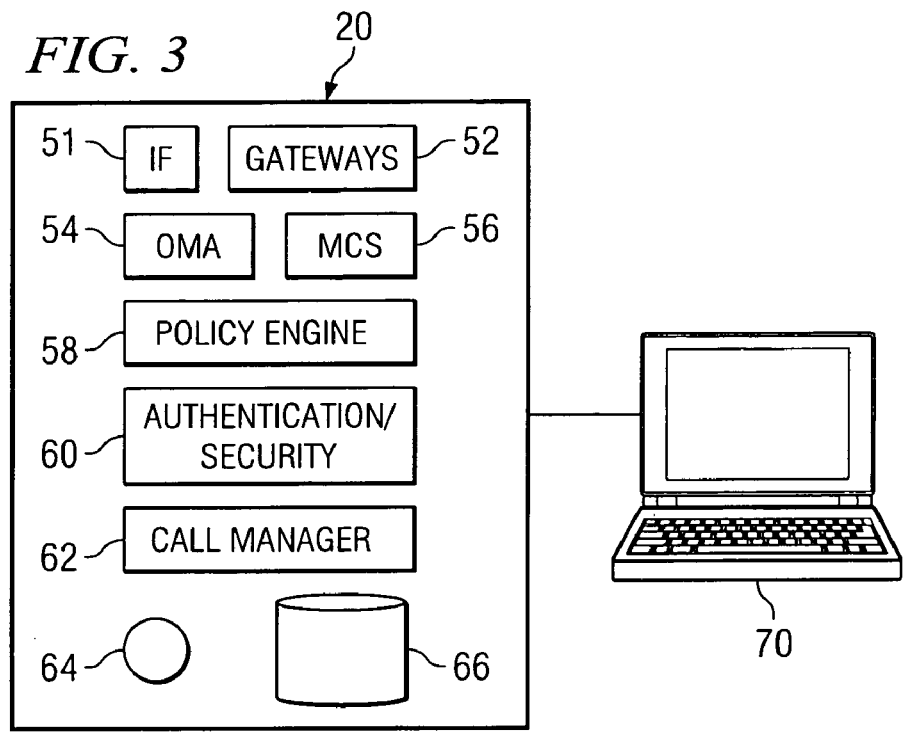
FIG. 3 illustrates an example interoperability system, in accordance with a particular embodiment.

FIG. 3 illustrates an IS 20, in accordance with a particular embodiment. IS 20 may be substantially similar to the IS of FIG. 1. IS 20 may be used by any suitable person, such as a dispatcher, an administrator, or a first responder mobile user.

A control endpoint may refer to an endpoint utilized to access, configure, and control the functionality of IS 20. In one embodiment, a PC endpoint 70 may be used to access, configure, and control IS 20. PC endpoint 70 may run a client application for such access, configuration, and control. The client application may enable a user of endpoint 70 to receive and monitor communications from endpoints and virtual talk groups. Other suitable control endpoints, such as an IP phone, a PDA, or a mobile device, may be utilized to access, configure, and control IS 20.

In the illustrated embodiment, IS 20 includes an interface (I/F) 51, gateways 52, an operations management application (OMA) 54, a multipoint conference system (MCS) 56, a policy engine 58, an authentication and security system 60, a call manager 62, a processor 64, and a memory module 66.

Interface 51 facilitates the communication of information between IS 20 and other network components. For example, interface 51 may receive communications from endpoints. The communication may take place over IP networks, which may reduce the need for dedicated wiring between the endpoints and IS 20.

Gateways 52 may represent one or more gateways that provide network interoperability. Example gateways 52 include LMR gateways, PSTN gateways, or application gateways. Gateways 52 may provide mappings between IP services and interoperable networks, such as an LMR network. In some cases, gateways 52 may not be located within IS 20, but may be distributed throughout a communication system for enabling communications among communication networks.

Operations management application (OMA) 54 includes functionality for configuration, management, and control of IS 20. OMA 54 may provide conference and collaboration management. OMA 54 may simultaneously monitor and provide communication ability for any number of channels to allow a user to simultaneously communicate with and control multiple virtual talk groups. OMA 54 may also authenticate a user and obtain user configuration information.

OMA 54 may be accessed by a user via a control endpoint, for example, PC endpoint 70 or a mobile endpoint. OMA 54 may allow a control endpoint to configure, manage, and simultaneously participate in one or more virtual talk groups and ad hoc conferences. In particular embodiments, OMA 54 may be accessed through a web interface functioning, for example, as a soft phone for a radio.

Multipoint conference system (MCS) 56 provides collaboration and conference services for multiple endpoints of one or more networks. For example, different types of endpoints of different networks may be bridged together through MCS 56 to provide virtual talk group communications. MCS 56 may include any suitable number or type of conference bridges, ports, digital signal processors, or other components to facilitate communications.

Policy engine 58 includes policies, such as pre-determined and ad hoc policies, specifying actions to take in response to events in order to provide dynamic incident management. In one embodiment, policy engine 58 may receive input from detectors such as alarms and sensors. Policy engine 58 may then set up communication interoperability and one-way information collaboration, and may trigger additional actions such as pager, e-mail, or other notifications, dial-outs, data recording, or information escalation.

Authentication and security system 60 manages access, configuration, and control privileges for users of IS 20 and endpoints 22. Different users may have different privileges. Some users may have only transmit or listen privileges with respect to one or more particular talk groups, while other users may have the ability to communicate with all talk groups or to setup and configure talk groups. User privileges may dynamically change in response to the occurrence of particular events.

Call manager 62 maintains information regarding users, such as the users of IP networks for which interoperable communications are provided by IS 20. The information may include a name or other identifier and contact information such as phone numbers and email addresses.

Processor 64 may comprise a processor operable to provide IS 20 functionality, either alone or in conjunction with other IS components such as OMA 54. Such functionality may include providing features discussed herein. Other features may include: providing location information of endpoints; enabling an endpoint to listen to and/or participate in communications involving endpoints of a particular geographic area; presenting communication of endpoints of scene-related virtual talk groups; and controlling gateways and other network components to facilitate interoperable communications among endpoints.

Memory module 66 may comprise memory operable to store any suitable information utilized by IS 20. In particular embodiments, information may include information for user management, virtual talk group management, resource pool management, privileges, backup configuration, and/or timestamp and activity tracking.

IS 20 may be used to facilitate creation of a virtual talk group. An operator of IS 20 may configure a virtual talk group using any suitable interface. For example, an interface may allow an operator to configure a virtual talk group by dragging and dropping graphical elements representing channels and IP endpoints into an area representing the virtual talk group. An operator may configure group details such as name, description, participants, multicast IP addresses, codec, and latch options through, for example, OMA 54.

IS 20 may be used to facilitate communication among endpoints of a virtual talk group. MCS 56 may provide conferencing functionality for the endpoints. In particular embodiments, multiple talk groups may be patched together on a dynamic basis. In some cases, a virtual talk group may not necessarily include communications through IS 20, but may instead include member endpoints whose communications are mapped to IP addresses at gateways controlled by IS 20.

Modifications, additions, or omissions may be made to IS 20 without departing from the scope of the invention. For example, IS 20 may also include any number of switches, routers, firewalls, mobile access routers, access points, wireless bridges, or other components. The components of system IS 20 may be integrated or separated according to particular needs. Moreover, the operations of system IS 20 may be performed by more, fewer, or other modules. Additionally, operations of IS 20 may be performed using any suitable logic.

Figure 4:
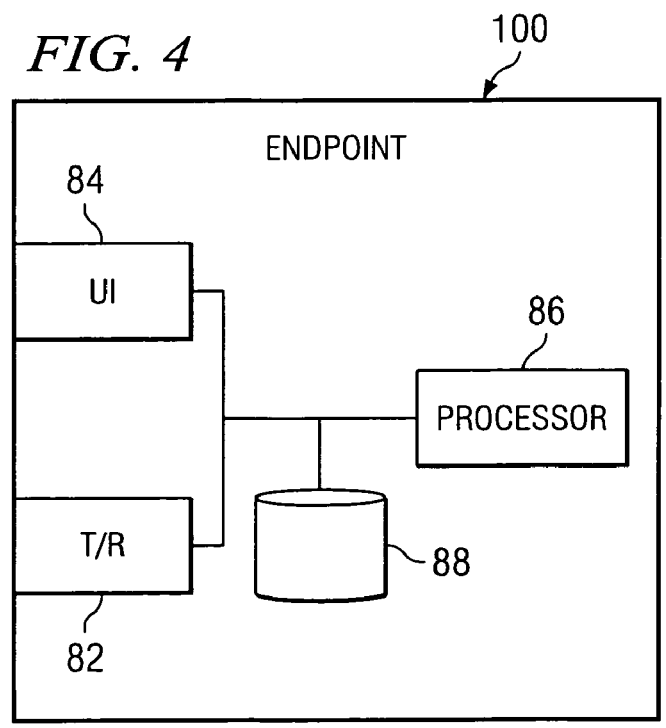
FIG. 4 illustrates an example endpoint, in accordance with a particular embodiment.

FIG. 4 illustrates an endpoint 100, in accordance with a particular embodiment. Endpoint 100 may represent any suitable device or system of devices operable to provide communication services to a user, and may be substantially similar to endpoints 22 of FIG. 1.

Endpoint 100 includes a transmitter/receiver 82, a user interface 84, a processor 86, and a memory module 88. Transmitter/receiver 82 transmits and receives streams that communicate information to and from other network components.

User interface 84 provides a mechanism through which a user of endpoint 100 may operate endpoint 100 and communicate with other network devices. User interface 84 may comprise, for example, a microphone, a speaker, a keypad, a display, or any other suitable interface. Instructions may be submitted through speech, keystrokes, soft keystrokes, or other mechanism. According to one embodiment, user interface 84 includes a microphone operable to record an announcement for a user, and a speaker operable to play an announcement for a user. An example user interface 84 is described with reference to FIG. 5.

Processor 86 may comprise a processor operable to facilitate operation of endpoint 100. Memory module 88 may comprise memory operable to store information for endpoint 80.

Modifications, additions, or omissions may be made to endpoint 100 without departing from the scope of the invention. The components of endpoint 100 may be integrated or separated according to particular needs. Moreover, the operations of endpoint 100 may be performed by more, fewer, or other modules. Additionally, operations of endpoint 100 may be performed using any suitable logic.

Figure 5:
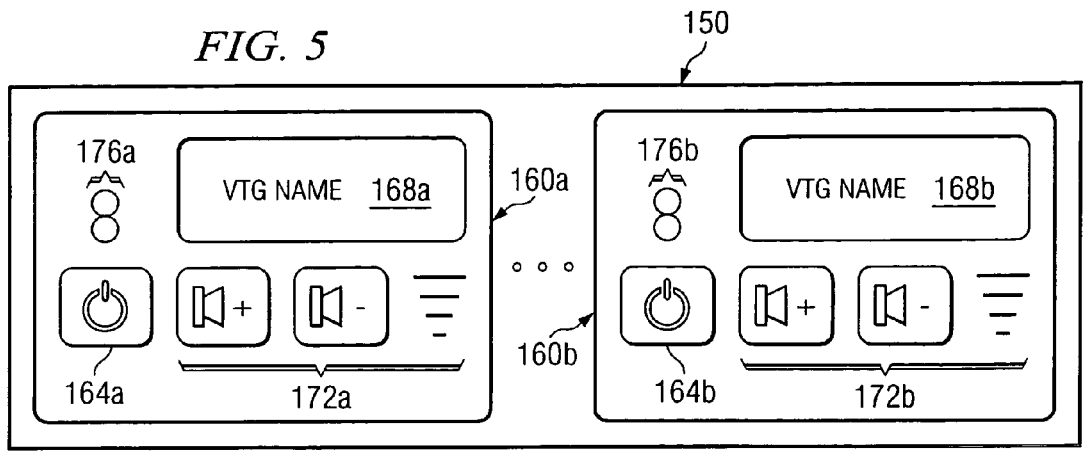
FIG. 5 illustrates an example endpoint user interface, in accordance with a particular embodiment.

FIG. 5 illustrates an example endpoint user interface 150, in accordance with a particular embodiment. User interface 150 may be used with endpoint 100 of FIG. 4 to select and manage participation in virtual talk groups.

User interface 150 includes one or more group sections 160. A group section 160 may correspond to a virtual talk group, and may be used to manage participation in the virtual talk group. A group section 160 for a virtual talk group includes an activation/deactivation selector 164, a talk button 168, volume controls 172, and transmit and receive indicators 176.

Activation/deactivation selector 168 may be used to activate or deactivate a channel to, for example, join or leave the virtual talk group. Talk button 164 may be used to request floor control from IS 20 in order to be able to send streams to other members of the virtual talk group. Talk button 164 may be selected to request floor control, and may be deselected to relinquish floor control. In one embodiment, talk button 164 may have multiple sections, where each section corresponds to a phrase to be announced. According to the illustrated embodiment, talk button 164 displays the name of the virtual talk group.

Volume controls 172 may be used to increase or decrease the volume from the virtual talk group. A volume control 172 may include an indicator that indicates the volume level of the channel. Transmit and receive indicators 176 may indicate whether traffic is being transmitted and received, respectively.

Modifications, additions, or omissions may be made to user interface 150 without departing from the scope of the invention. User interface 150 may include more, fewer, or other graphical elements. Additionally, graphical elements may be configured in any suitable arrangement without departing from the scope of the invention.

Figure 6:
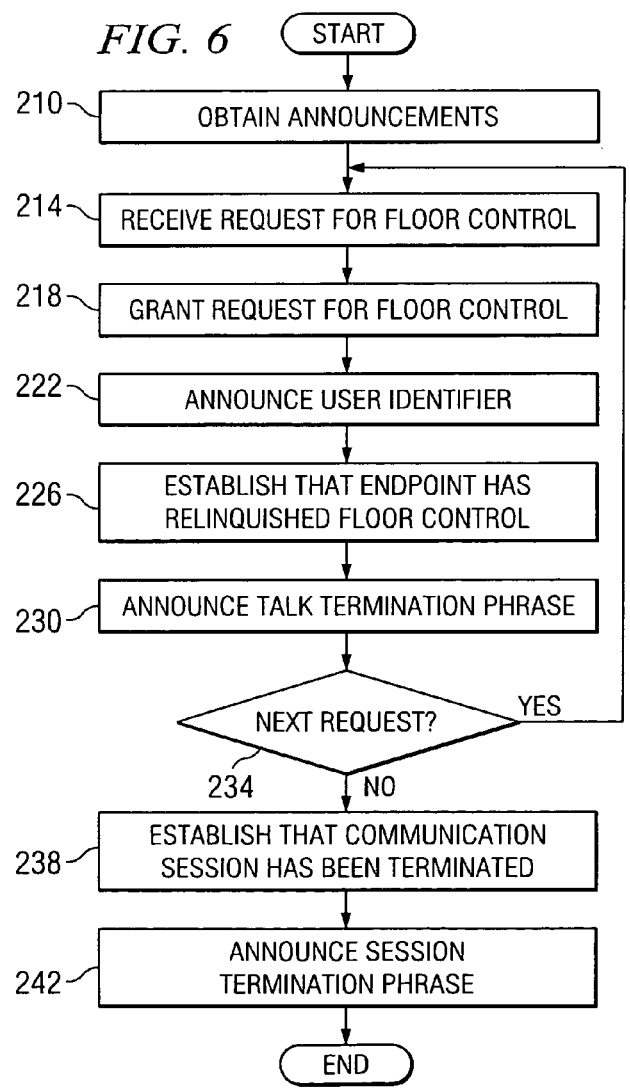
FIG. 6 illustrates a method for providing a push-to-talk communication session, in accordance with a particular embodiment.

FIG. 6 illustrates a method for providing a push-to-talk service, in accordance with a particular embodiment. The push-to-talk service may be provided in part by IS 20 for a push-to-talk endpoint 22 communicating with one or more virtual talk groups in one or more communication sessions.

The method begins at step 210, where announcements for a user of endpoint 22 are obtained. Announcements may include announcements of the user identifier of the user, a talk termination phrase, and a session termination phrase. The user may record the announcements using a microphone at endpoint 22.

A request for floor control for one or more virtual talk groups is received from endpoint 22 by IS 20 at step 214. Floor control allows endpoint 22 to send streams to other endpoints 22 of the virtual talk groups. The request for floor control is granted at step 218. The user identifier is announced to the virtual talk groups at step 222. The user identifier announcement may be played through speakers of the endpoints 22 of virtual talk groups. Specific user identifiers may be announced to particular virtual talk groups.

IS 20 establishes that endpoint 22 has relinquished floor control at step 226. The talk termination phrase is announced to the virtual talk groups at step 230. The talk termination announcement may be played through speakers of the endpoints 22 of virtual talk groups.

There may be a next request for floor control from endpoint 22 at step 234. If there is a next request, the method returns to step 214 to receive the next request. If there is no next request, the method proceeds to step 238.

IS 20 establishes that endpoint 22 has terminated the communication session at step 238. The session termination phrase is announced to the virtual talk groups at step 242. The session termination announcement may be played through speakers of the endpoints 22 of virtual talk groups. After providing the session termination announcement, the method terminates.

Modifications, additions, or omissions may be made to the method without departing from the scope of the invention. The method may include more, fewer, or other steps. Additionally, steps may be performed in any suitable order without departing from the scope of the invention.

Technical advantages of particular embodiments include automatically providing announcements to endpoints in response to trigger events that occur at a half-duplex endpoint. Automatically providing announcements may allow for more efficient communication with half-duplex endpoints. Moreover, in some cases, the announcements may include phrases that indicate the activity status of endpoints, allowing users to efficiently communicate their status.

In addition, in particular embodiments in which a half-duplex endpoint is participating in multiple virtual talk groups, a specific announcement may be provided to each group. Furthermore, in some cases, the announcements may be stored at an interoperability system and downloaded to the endpoints.

While various implementations and features are discussed with respect to multiple embodiments, it should be understood that such implementations and features may be combined in various embodiments. For example, features and functionality discussed with respect to a particular figure may be used in connection with features and functionality discussed with respect to another such figure according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged, or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations, and modifications may be ascertained by those skilled in the art. The present invention encompasses all such changes, substitutions, variations, alterations, and modifications as falling within the spirit and scope of the appended claims.

What is claimed is:

1. A method for providing one or more announcements for one or more communication sessions, comprising:
    facilitating one or more communication sessions among a plurality of endpoints, the plurality of endpoints comprising a half-duplex push-to-talk endpoint;
    establishing, by an interoperability system distinct from the endpoints, that a section of a button of the half-duplex push-to-talk endpoint has been deselected to yield a trigger event at the half-duplex push-to-talk endpoint, the trigger event indicating an activity status of the half-duplex push-to-talk endpoint;
    identifying, by the interoperability system, a set of two or more pre-recorded announcements associated with the trigger event from a plurality of sets of pre-recorded announcements, each set of pre-recorded announcements associated with a different trigger event, each announcement of the set corresponding to a different virtual talk group; and
    playing, by the interoperability system, the identified pre-recorded announcements by playing a first announcement of the set to a first virtual talk group and playing a second announcement of the set to a second virtual talk group.

2. The method of claim 1, wherein:
    the trigger event comprises deselection of a first section of the button to indicate that the half-duplex push-to-talk endpoint has relinquished floor control of the one or more communication sessions; and
    the one or more announcements comprise a talk termination announcement.

3. The method of claim 1, wherein:
    the trigger event comprises deselection of a second section of the button to indicate that the half-duplex push-to-talk endpoint has terminated the one or more communication sessions; and
    the one or more announcements comprise a session termination announcement.

4. The method of claim 1, further comprising:
    establishing that the button of the half-duplex push-to-talk endpoint has been selected to indicate that the half-duplex push-to-talk endpoint has requested floor control for the one or more communication sessions; and
    playing a pre-recorded user identifier announcement announcing a user identifier of a user associated with the half-duplex push-to-talk endpoint.

5. The method of claim 1, further comprising:
    obtaining the one or more announcements by recording the voice of a user associated with the half-duplex push-to-talk endpoint.

6. The method of claim 1, wherein playing the identified pre-recorded announcements further comprises:
    playing the first announcement to a user of the half-duplex push-to-talk endpoint at a first volume; and
    playing the second announcement to one or more users of the other endpoints at a second volume, the second volume greater than the first volume.

7. The method of claim 1, further comprising:
    storing the one or more announcements at the interoperability system; and
    downloading the one or more announcements from the interoperability system to the half-duplex push-to-talk endpoint.

8. A system for providing one or more announcements for one or more communication sessions, comprising:
    an interface of an interoperability system distinct from a plurality of endpoints, the interface operable to:
        send and receive a plurality of messages to facilitate one or more communication sessions among the endpoints, the plurality of endpoints comprising a half-duplex push-to-talk endpoint; and
    a processor of the interoperability system, the processor coupled to the interface and operable to:
        establish that a section of a button of the half-duplex push-to-talk endpoint has been deselected to yield a trigger event at the half-duplex push-to-talk endpoint, the trigger event indicating an activity status of the half-duplex push-to-talk endpoint;
        identify a set of two or more pre-recorded announcements associated with the trigger event from a plurality of sets of pre-recorded announcements, each set of pre-recorded announcements associated with a different trigger event, each announcement of the set corresponding to a different virtual talk group; and
        play the identified pre-recorded announcements by playing a first announcement of the set to a first virtual talk group and playing a second announcement of the set to a second virtual talk group.

9. The system of claim 8, wherein:
    the trigger event comprises deselection of a first section of the button to indicate that the half-duplex push-to-talk endpoint has relinquished floor control of the one or more communication sessions; and
    the one or more announcements comprise a talk termination announcement.

10. The system of claim 8, wherein:
    the trigger event comprises deselection of a second section of the button to indicate that the half-duplex push-to-talk endpoint has terminated the one or more communication sessions; and
    the one or more announcements comprise a session termination announcement.

11. The system of claim 8, wherein the processor is further operable to:

establish that the button of the half-duplex push-to-talk endpoint has been selected to indicate that the half-duplex push-to-talk endpoint has requested floor control for the one or more communication sessions; and play a pre-recorded user identifier announcement announcing a user identifier of a user associated with the half-duplex push-to-talk endpoint.

12. The system of claim 8, wherein the processor is further operable to:

obtain the one or more announcements by recording the voice of a user associated with the half-duplex push-to-talk endpoint.

13. The system of claim 8, wherein the processor is further operable to play the identified pre-recorded announcements by:

playing the first announcement to a user of the half-duplex push-to-talk endpoint at a first volume; and playing the second announcement to one or more users of the other endpoints at a second volume, the second volume greater than the first volume.

14. The system of claim 8, wherein the processor is further operable to:

store the one or more announcements; and download the one or more announcements to the half-duplex push-to-talk endpoint.

15. A non-transitory computer-readable storage medium storing logic for providing one or more announcements for one or more communication sessions, the logic when executed by a processor operable to:

facilitate one or more communication sessions among a plurality of endpoints, the plurality of endpoints comprising a half-duplex push-to-talk endpoint;

establish, by an interoperability system distinct from the endpoints that a section of a button of the half-duplex push-to-talk endpoint has been deselected to yield a trigger event at the half-duplex push-to-talk endpoint, the trigger event indicating an activity status of the half-duplex push-to-talk endpoint;

identify, by the interoperability system, a set of two or more pre-recorded announcements associated with the trigger event from a plurality of sets of pre-recorded announcements, each set of pre-recorded announcements associated with a different trigger event, each announcement of the set corresponding to a different virtual talk group; and play, by the interoperability system, the identified pre-recorded announcements by playing a first announcement of the set to a first virtual talk group and playing a second announcement of the set to a second virtual talk group.

16. The non-transitory computer-readable storage medium of claim 15, wherein;

the trigger event comprises deselection of a first section of the button to indicate that the half-duplex push-to-talk endpoint has relinquished floor control of the one or more communication sessions; and the one or more announcements comprise a talk termination announcement.

17. The non-transitory computer-readable storage medium of claim 15, wherein:

the trigger event comprises deselection of a second section of the button to indicate that the half-duplex push-to-talk endpoint has terminated the one or more communication sessions; and the one or more announcements comprise a session termination announcement.

18. The non-transitory computer-readable storage medium of claim 15, further operable to:

establish that the button of the half-duplex push-to-talk endpoint has been selected to indicate that the half-duplex push-to-talk endpoint has requested floor control for the one or more communication sessions; and play a pre-recorded user identifier announcement announcing a user identifier of a user associated with the half-duplex push-to-talk endpoint.

19. The non-transitory computer-readable storage medium of claim 15, further operable to:

obtain the one or more announcements by recording the voice of a user associated with the half-duplex push-to-talk endpoint.

20. The non-transitory computer-readable storage medium of claim 15, further operable to play the identified pre-recorded announcements by:

playing the first announcement to a user of the half-duplex push-to-talk endpoint at a first volume; and playing the second announcement to one or more users of the other endpoints at a second volume, the second volume greater than the first volume.

21. The non-transitory computer-readable storage medium of claim 15, further operable to:

store the one or more announcements at the interoperability system; and download the one or more announcements from the interoperability system to the half-duplex push-to-talk endpoint.

22. A system for providing one or more announcements for one or more communication sessions, comprising:

means for facilitating one or more communication sessions among a plurality of endpoints, the plurality of endpoints comprising a half-duplex push-to-talk endpoint;

means for establishing, by an interoperability system distinct from the endpoints, that a section of a button of the half-duplex push-to-talk endpoint has been deselected to yield a trigger event at the half-duplex push-to-talk endpoint, the trigger event indicating an activity status of the half-duplex push-to-talk endpoint;

means for identifying, by the interoperability system, a set of two or more pre-recorded announcements associated with the trigger event from a plurality of sets of pre-recorded announcements, each set of pre-recorded announcements associated with a different trigger event, each announcement of the set corresponding to a different virtual talk group; and means for playing, by the interoperability system, the identified pre-recorded announcements by playing a first announcement of the set to a first virtual talk group and playing a second announcement of the set to a second virtual talk group.

23. A method for providing one or more announcements for one or more communication sessions, comprising:

facilitating one or more communication sessions among a plurality of endpoints by facilitating the one or more communication sessions among a plurality of virtual talk groups, the plurality of endpoints comprising a half-duplex push-to-talk endpoint;

establishing, by an interoperability system distinct from the endpoints, that a section of a button of the half-duplex push-to-talk endpoint has been deselected to yield a trigger event at the half-duplex push-to-talk endpoint, the trigger event indicating an activity status of the half-duplex push-to-talk endpoint, the trigger event comprising deselection of a first section of the button to indicate at least one of:

the half-duplex push-to-talk endpoint has relinquished floor control of the one or more communication sessions;

the half-duplex push-to-talk endpoint has terminated the one or more communication sessions; and the half-duplex push-to-talk endpoint has requested floor control for the one or more communication sessions;

identifying, by the interoperability system, a set of two or more pre-recorded announcements associated with the trigger event from a plurality of sets of pre-recorded announcements, each set of pre-recorded announcements associated with a different trigger event, each announcement of the set corresponding to a different virtual talk group, the one or more announcements comprising:

a talk termination announcement if the trigger event comprises deselection of a first section of the button to indicate that the half-duplex push-to-talk endpoint has relinquished floor control of the one or more communication sessions;

a session termination announcement if the trigger event comprises deselection of a second section of the button to indicate that the half-duplex push-to-talk endpoint has terminated the one or more communication sessions; and a user identifier announcement announcing a user identifier of a user associated with the half-duplex push-to-talk endpoint if the button of the half-duplex push-to-talk endpoint has been selected to indicate that the half-duplex push-to-talk endpoint has requested floor control for the one or more communication sessions, the one or more announcements obtained by recording the voice of a user associated with the half-duplex push-to-talk endpoint, the one or more announcements stored at the interoperability system, the one or more announcements downloaded from the interoperability system to the half-duplex push-to-talk endpoint; and playing, by the interoperability system, the identified pre-recorded announcements to at least a subset of the plurality of endpoints by providing a first announcement of the set to a first virtual talk group and a second announcement of the set to a second virtual talk group, the one or more announcements provided by:

playing the first announcement to a user of the half-duplex push-to-talk endpoint at a first volume; and playing the second announcement to one or more users of the other endpoints at a second volume, the second volume greater than the first volume.

* * * * *